US012668351B2

(12) United States Patent
Everaert et al.

(10) Patent No.: US 12,668,351 B2
(45) Date of Patent: Jun. 30, 2026

(54) ACTUATION ASSEMBLY FOR A TRAILING EDGE FLAP OF AN AIRCRAFT WING

(71) Applicant: Asco Industries NV, Zaventem (BE)

(72) Inventors: Bob Armand Henri Everaert, Ghent (BE); Dirk De Wit, Willebroek (BE); Johan Francis Alfons Vervliet, Leuven (BE)

(73) Assignee: ASCO INDUSTRIES NV, Zaventem (BE)

( * ) Notice: Subject to any disclaimer, the term of this patent is extended or adjusted under 35 U.S.C. 154(b) by 1 day.

(21) Appl. No.: 19/042,938

(22) Filed: Jan. 31, 2025

(65) Prior Publication Data

US 2025/0249999 A1      Aug. 7, 2025

(30) Foreign Application Priority Data

Feb. 7, 2024     (EP) .................................... 24156415

(51) Int. Cl.
*B64C 3/50*          (2006.01)
*B64C 9/06*          (2006.01)
*B64C 9/16*          (2006.01)
(52) U.S. Cl.
CPC .................. *B64C 3/50* (2013.01); *B64C 9/06* (2013.01); *B64C 9/16* (2013.01)
(58) Field of Classification Search
CPC ................ B64C 3/50; B64C 9/06; B64C 9/16
See application file for complete search history.

(56) References Cited

U.S. PATENT DOCUMENTS

| | | | |
|---|---|---|---|
| 7,051,982 B1 | 5/2006 | Johnson | |
| 10,889,365 B2 | 1/2021 | Bowers et al. | |
| 10,899,431 B2 | 1/2021 | Lorenz | |
| 11,155,329 B2 | 10/2021 | Mokhtarian | |
| 11,174,003 B2 * | 11/2021 | Mokhtarian | .............. B64C 9/18 |

(Continued)

FOREIGN PATENT DOCUMENTS

| | | |
|---|---|---|
| CN | 110294102 A | 10/2019 |
| EP | 4286271 A1 | 12/2023 |
| GB | 2428996 A | 2/2007 |

OTHER PUBLICATIONS

Search Report, European Application No. 24156415.2, International Search Authority—European Patent Office, mailed Jun. 16, 2024.

(Continued)

*Primary Examiner* — Rodney A Bonnette
(74) *Attorney, Agent, or Firm* — Quarles & Brady LLP

(57)          ABSTRACT

Actuation assembly for a trailing edge flap of an aircraft wing, comprising: a base unit configured to be fixated to a main body of the aircraft wing; an intermediate unit movably connected to the base unit and configured to be hingeably connected to the flap at a leading edge of the flap about a first hinging axis extending along the leading edge of the flap, wherein the movability provides adjustability of the flap between a retracted flap position and an extended flap position; and a second actuator configured to controllably rotate the flap with respect to the intermediate unit about the first hinging axis, the second actuator being configured to be movable along with the intermediate unit with respect to the at least one base unit.

20 Claims, 10 Drawing Sheets

(56)        References Cited

U.S. PATENT DOCUMENTS

2006/0049308 A1\*   3/2006   Good ........................ B64C 3/50
                                                    244/76 A
2007/0034748 A1\*   2/2007   Sakurai .................... B64C 9/16
                                                    244/215
2023/0271696 A1      8/2023   Andreani et al.
2023/0382515 A1     11/2023   Tsai

OTHER PUBLICATIONS

Extended European Search Report, European Application No. 25155380. 6; mailed Jun. 18, 2025; 11 pages.

\* cited by examiner

AU,FR 25    26    27    24

AD,FE 25    26    27    24

ACTUATION ASSEMBLY FOR A TRAILING EDGE FLAP OF AN AIRCRAFT WING

CROSS-REFERENCE TO RELATED APPLICATIONS

This application claims priority to European Application No. 24156415.2, filed Feb. 7, 2024, which incorporated herein by reference in its entirety.

FIELD

The invention relates to an actuation assembly for a trailing edge flap of an aircraft wing. The invention further relates to: an actuation mechanism comprising the actuation assembly, a trailing edge flap assembly comprising the actuation assembly; an actuation system comprising the actuation assembly; an aircraft wing comprising the trailing edge flap assembly; an aircraft comprising the aircraft wing; and a method of operating the aircraft.

BACKGROUND

Actuation assemblies for a trailing edge flap of an aircraft wing are known as such, for example from EP4286271A1. As explained there, to improve fuel efficiency in aviation, it has been hypothesized that traditionally separate high-lift devices and ailerons for aircraft wings could be combined, in particular in the form of a so-called multifunctional trailing edge flap allowing so-called Fowler motion as well as full aileron motions for the same flap. Compared to traditional trailing edge flaps and ailerons, which are generally arranged next to each other along the wing, such a combined or multifunctional flap may have a relatively large spanwise width, resulting in increased effectiveness at same flap angles, or similar effectiveness at smaller flap angles. Other types of flap motion besides Fowler motion are known as well, for example so-called dropped-hinge motion.

While the actuation assembly of EP4286271A1 as such represents a substantial improvement, still further improvement is desired. In particular, it is desired to reduce weight and size of the assembly so as to improve fuel efficiency even further, which in turn may provide environmental benefits, e.g. by reducing emissions. Meanwhile, it is desired to maintain or improve load efficiency of actuation assemblies and associated aircraft, and to maintain or improve robustness of actuation assemblies and associated aircraft.

SUMMARY

An object of the invention is to provide an improved actuation assembly for a multifunctional trailing edge flap of an aircraft wing, wherein in particular weight and/or size of the actuation assembly, the wing and/or the aircraft may be reduced while maintaining advantages of known actuation assemblies. An object is to at least provide an alternative actuation assembly.

An aspect of the invention provides an actuation assembly for a trailing edge flap of an aircraft wing. The actuation assembly may comprise at least one base unit configured to be fixated to a main body of the aircraft wing. The actuation assembly may comprise an intermediate unit movably connected to the at least one base unit and configured to be hingeably connected to the flap at a leading edge of the flap about a first hinging axis extending along the leading edge of the flap. The movability of the intermediate unit with respect to the at least one base unit, in particular in combination with an associated first actuator, may provide controllable adjustability of the flap, when connected, between a retracted flap position and an extended flap position. In the extended flap position, the flap extends further from the main body of the aircraft wing than in the retracted flap position. During use of the actuation assembly, the first actuator is preferably also hingeably connected to the flap at the leading edge of the flap about the first hinging axis. The actuation assembly may comprise a second actuator configured to controllably rotate the flap with respect to the intermediate unit about the first hinging axis. The second actuator may be configured to be movable along with the intermediate unit with respect to the at least one base unit, in particular by the first actuator.

In particular when viewed in the direction of the first hinging axis, the second actuator and the at least one base unit may extend away from each other from respective ends that are movably interconnected, in particular both in the retracted flap position and the extended flap position. Said movable interconnection may be by and/or at the intermediate unit. For example, in particular when viewed in the direction of the first hinging axis, the intermediate unit may be configured to mutually space apart the second actuator and the at least one base unit, both in the retracted flap position and the extended flap position. Alternatively, for example, an end of the second actuator may form a hingeable connection with an end of the at least one base unit, where optionally also an end of the intermediate unit may be hingeably connected.

Advantageously, such configurations allow the actuation assembly to be relatively light-weight and compact, in particular having a relatively small width when seen in the flight direction of the aircraft, as explained further elsewhere herein. In case the actuation assembly is provided with a fairing, the fairing can correspondingly be relatively compact, thereby reducing aerodynamic drag and thus improve fuel efficiency and reduce emissions. Meanwhile, the controllable rotation of the flap by the second actuator preferably allows the flap to be used as an aileron of the aircraft wing, providing adjustability of the flap between an aileron up position and an aileron down position via an intermediate aileron neutral position, in particular in combinations with both the retracted flap position and the extended flap position. In some variants, the second actuator may additionally contribute to movement of the flap between retracted flap and extended flap positions.

As used herein, it shall be appreciated that when the first hinging axis extends along the leading edge of the flap, the first hinging axis may be substantially parallel to a main direction of the leading edge of the flap at least locally at the respective hingeable connection. When moreover the hingeable connection between the flap and the intermediate unit is at the leading edge of the flap, it shall be appreciated that the hinging axis will be positioned at the leading edge of the flap as well, wherein nevertheless the first hinging axis need not exactly coincide with the leading edge of the flap, in particular as long as the position of the first hinging axis at least enables the leading edge of the flap to remain in a functionally same place with respect to the main body of the aircraft wing irrespective of the hinging about the first hinging axis.

The first actuator may be part of the actuation assembly or may be arranged adjacent thereto, as explained further elsewhere herein. The first actuator is preferably configured to controllably move the intermediate unit with respect to the at least one base unit so as to controllably adjust the flap between the retracted flap position and the extended flap position as described herein.

The second actuator may be connected to the intermediate unit to be movable along with the intermediate unit with respect to the at least one base unit by the first actuator.

Optionally, the actuation assembly has a symmetrical mechanical arrangement with a plane of symmetry extending at an angle to the first hinging axis.

In this way, the actuation assembly can be mechanically relatively well balanced, which in turn may allow for lighter and/or more compact components while still providing sufficient stiffness and robustness.

Optionally, the second actuator is a linear actuator.

A linear actuator can be particularly effective as second actuator. A linear actuator is configured to create linear motion. Examples of a linear actuator include a cylinder-piston-assembly, a linear motor, and a combination of a rotary actuator with a rotation-to-translation converter mechanism.

Optionally, in one or more positions of the flap with respect to the main body of the aircraft wing, the second actuator as linear actuator has an actuation line that substantially coincides with a central plane of the at least one base unit, said central plane extending at an angle to the first hinging axis, in particular at a central position with respect to the fixation of the at least one base unit to the main body of the aircraft wing.

In this way, force transmission between the second actuator and the aircraft wing can be particularly well balanced, in particular with little or no tendency of warping.

Optionally, the first actuator is a linear actuator.

A linear actuator can be particularly effective as first actuator. Alternatively, the first actuator may be a rotary actuator, as explained elsewhere herein.

Optionally, the first actuator as linear actuator has an actuation line that substantially coincides with the aforementioned central plane of the at least one base unit and/or that intersects with the aforementioned optional actuation line of the second actuator as linear actuator.

In this way, force transmission between the first actuator on the one hand and on the other hand the aircraft wing and/or the second actuator can be particularly well balanced, in particular with little or no tendency of warping.

Optionally, the movable connection of the intermediate unit to the at least one base unit is a hingeable connection defining a second hinging axis extending substantially parallel to the first hinging axis at a distance from the first hinging axis, wherein the movement of the intermediate unit with respect to the at least one base unit by the first actuator is a rotation about the second hinging axis.

Advantageously, since the second hinging axis is thus at a distance from the leading edge of the flap, a rotation of the flap about the second hinging axis allows to controllably vary a distance between the leading edge of the flap and the main body of the aircraft wing, enabling adjustment of the flap between the retracted flap position and the extended flap position using a hingeable connection. At the same time, when rotating the flap about the second hinging axis, the flap is rotated with respect to the main body of the aircraft wing. In some variants, this rotation may advantageously contribute to maintaining the flap in a same or at least functionally similar aileron position while being adjusted between the retracted flap position and the extended flap position. It shall be appreciated that the distance between the hinging axes may vary among actuation assemblies of a same flap or wing.

Optionally, in case of the second hinging axis as described above, the first actuator may be a rotary actuator having a stator and a rotor, the rotor being rotatably actuatable with respect to the stator about a first actuator rotation axis.

Such a rotary actuator provides an alternative to a linear actuator as first actuator, and may in some cases allow the actuation assembly to be more compact, in particular with respect to directions transverse to the first hinging axis.

Optionally, the stator is coupled, e.g. fixed, to the at least one base unit, wherein the rotor is coupled to the intermediate unit and/or to the flap.

In this way, the intermediate unit can remain relatively light weight so that energy expenditure by the first actuator can be relatively moderate. Also, a power line for the first actuator from the main body of the aircraft wing can be provided more robustly when the stator can be stationary with respect to the at least one base unit.

Optionally, the first actuator rotation axis extends substantially parallel to the second hinging axis at a distance from the second hinging axis.

Thus, the first actuator as rotary actuator may be arranged at a distance from the second hinging axis, allowing the actuation assembly to be relatively compact at the second hinging axis, in particular without requiring a complex transmission mechanism, e.g. between the rotor and the intermediate unit.

Optionally, the coupling between the rotor and the intermediate unit is provided by a linkage.

A linkage may provide a relatively simple yet effective coupling, in particular while allowing the actuation assembly to be relatively compact.

Optionally, the linkage is, or is part of, a double rocker linkage having a ground link, two rocker links and a floating link, wherein the at least one base unit is configured to form the ground link, wherein the intermediate unit is configured to form one of the rocker links, wherein the rotor of the first actuator is coupled, e.g. fixed, to the other one of the rocker links.

Such a double rocker linkage can provide a particularly effective yet compact coupling while allowing the first actuator rotation axis to be spaced apart from the second hinging axis. The floating link may be connected to the intermediate unit directly. In a possible alternative, the floating link may be connected to the intermediate unit via the flap, in particular being connected to the flap at or near the leading edge of the flap, i.e. near where the intermediate unit is hingeably connected to the flap.

Optionally, as an alternative to the second hinging axis as described above, the movable connection of the intermediate unit to the at least one base unit may be a slidable connection defining a slide path extending substantially transverse to the first hinging axis, wherein the movement of the intermediate unit with respect to the at least one base unit by the first actuator is a movement along the slide path.

Such a configuration can allow the at least one base unit to be relatively light weight and compact, while still allowing the desired flap movements. It shall be appreciated that various types of slideable connection may be used, wherein for examples rollers may be used as mentioned elsewhere herein.

Optionally, the intermediate unit comprises a track slidably engaged with the at least one base unit to form the slidable connection.

Advantageously, when the intermediate unit comprises such a track, the at least one base unit may be particularly compact. In particular, such a configuration may facilitate the intermediate unit to mutually space apart the second actuator and the at least one base unit, as mentioned elsewhere herein, so as to allow the actuation assembly to have a relatively small width and thus enable reduction of aerodynamic drag. Also, such a configuration may facilitate the preferred symmetrical mechanical arrangement as mentioned elsewhere herein, including the aforementioned preferred mutual coincidence of the actuation line of the second actuator, the actuation line of the first actuator, and the central plane of the at least one base unit.

Optionally, the at least one base unit is provided with rollers for the slidable engagement with the track of the intermediate unit.

A particularly effective slidable engagement may be realized using such rollers, in particular with relatively low friction. Alternatively or additionally to such rollers, sliding pads may be used.

Optionally, the track is straight so as to define a straight slide path, in particular so that the movement of the intermediate unit with respect to the at least one base unit by the first actuator is a pure translation.

In this way, control of movements of the flap with respect to the main body of the wing can distinguish between flap translations and flap rotations in a relatively simple and robust manner using respective actuators. Meanwhile, by operating both the first actuator and second actuator, a combination of flap translations and flap rotations is also possible, for example to effect a so-called Fowler motion.

Alternatively to the track being straight, the track may be non-straight, for example curved and/or angled. Such a non-straight track may for example impose or otherwise contribute to a so-called Fowler motion for the flap. In this way, also, a required stroke for the second actuator may be reduced.

Optionally, the first actuator is and/or comprises at least one of an electric actuator, a hydraulic or electrohydraulic actuator, a electrohydrostatic actuator and a driveshaft driven actuator. Optionally, the second actuator is and/or comprises at least one of an electric actuator, a hydraulic or electrohydraulic actuator and a electrohydrostatic actuator. Thus, the invention may provide a high degree of design freedom, in particular regarding possible actuator types.

Optionally, the first actuator is part of the actuation assembly, in particular being arranged to connect to the main body of the aircraft wing via the at least one base unit. It shall be appreciated that in that case, the preferred symmetrical mechanical arrangement of the actuation assembly as described elsewhere herein also concerns the arrangement of the first actuator within the actuation assembly, e.g. relative to the at least one base unit and/or the second actuator.

Optionally, the base unit is constructed from two shells that are joined together at the central plane. Optionally, each of the shells has a planar bottom and a circumferential side wall extending along a perimeter of the bottom. Optionally, each of the shells is formed with reinforcement ribs therein that preferably interconnect the circumferential side wall at different positions along the perimeter of the bottom. Optionally, the side wall and the reinforcement ribs together form a lattice and/or truss structure. Optionally, the two shells are joined together at the central plane with their bottoms spaced apart and facing away from each other, in particular such that the reinforcement ribs are arranged between the bottoms and/or are enclosed internally in the base unit. Alternatively, the two shells may be joined together at the central plane with their bottoms in mutual contact and facing each other. To facilitate the joining of the shells, plates may be mounted to the side walls so as to overlap corresponding sections of both side walls. Preferably, such plates and side walls have flat contact surfaces so as to facilitate assembly. Respective side wall sections of the shells may be in mutual contact when the shells are joined together. To save weight, openings may be formed in the bottoms, in particular spaced apart from where the reinforcement ribs extend. Edges of the openings may be reinforced, e.g. by circumferential ribs.

Alternatively to the first actuator being part of the actuation assembly, the actuation assembly and the first actuator may be configured to be arranged adjacent to each other, in particular to be interconnected via the main body of the aircraft wing and via the flap. In this way, the actuation assembly itself can be particularly compact in terms of a direction normal to the underside of the wing. Meanwhile, since already available strength and stiffness of the wing and the flap can be utilized for the connection between the actuation assembly and the first actuator, the actuation assembly and first actuator themselves can be relatively light-weight.

A further aspect provides an actuation mechanism for a trailing edge flap of an aircraft wing, comprising at least one actuation assembly as described herein, wherein the actuation mechanism comprises the associated first actuator, in particular respectively for each actuation assembly, for example as part of the respective actuation assembly or arrangeable adjacent thereto.

Preferably, during use and/or as part of the actuation mechanism, the actuation assembly, in particular the base unit, and the first actuator are structurally interconnected via the main body of the aircraft wing and via the flap. Thus, the actuation mechanism may be free from structural interconnections between the actuation assembly and the first actuator that do not comprise any section of the flap or the main body of the aircraft wing. Alternatively, one or more additional structural interconnections between the actuation assembly, in particular the base unit, and the first actuator may be provided other than via the flap or the main body of the wing. A same wing bracket of the main body of the wing may be part of the structural interconnection between the actuation assembly, in particular the base unit, and the first actuator. Alternatively or additionally, a separate intermediate bracket may be part of said structural interconnection.

Preferably, during use and/or as part of the actuation mechanism, the actuation assembly and the first actuator are mounted to the main body of the aircraft wing at mutually different wing mount positions along the first hinging axis. Preferably, during use and/or as part of the actuation mechanism, the actuation assembly and the first actuator are mounted to the flap at mutually different flap mount positions along the first hinging axis. The different wing mount positions and/or flap mount positions may determine an interspace between the first actuator and the actuation assembly, in particular along the first hinging axis. Respective mounts of the first actuator and the actuation assembly may be in non-structural mutual contact when mounted.

As indicated elsewhere herein, during use of the actuation assembly and/or as part of the actuation mechanism, both the first actuator and the intermediate unit are preferably hingeably connected to the flap at the leading edge of the flap about the first hinging axis. Thus, the first actuator and the actuation assembly are preferably mounted to the flap such that the flap can hinge with respect to both the first actuator and the intermediate unit about the same first hinging axis that extends along the leading edge of the flap. To facilitate such hinging, individual hinges of the actuation assembly and/or the first actuator may be configured to provide rotational freedom in terms of a hinging axis orientation with respect to the hinge, preferably without providing translation freedom in this respect. Meanwhile, the first hinging axis can still be sufficiently stable, e.g. when a plurality of actuation mechanisms are distributed along the first hinging axis. Also, one or two actuation mechanisms of a flap may be specifically designed to promote stability of the first hinging axis, e.g. using hinges that provide hinging about the hinging axis with less or no rotational freedom for the orientation of the hinging axis, while other actuation mechanisms of the flap may be configured to allow more of such rotational freedom so as to tolerate expected wing and/or flap deformations. A corresponding configuration of using rotational freedom in terms of hinging axis orientation is preferably applied with respect to hinges associated with the second hinging axis, in particular irrespective of whether or not such a configuration is applied with respect to the first hinging axis.

The actuation assembly and/or the actuation mechanism may be provided with a fairing. The fairing is preferably configured to also cover the associated first actuator during use. The fairing may for example comprise two main fairing parts, wherein for example one main fairing part may be coupled to the at least one base unit and another main fairing part may be coupled to the flap, e.g. via a drive strut. The fairing preferably comprises a flexible and/or resilient bridging element that is arranged to cover and/or seal a gap or other aerodynamic interruption between said main fairing parts while still allowing mutual movement of said main fairing parts for the different possible flap positions including aileron positions as described elsewhere herein. The bridging element may for example be made from and/or comprise silicone, and is preferably arranged and/or shaped to reduce aerodynamic resistance of the fairing in different possible flap positions. The bridging element may be or comprise a lip that is fixed to one of the main fairing parts so as to substantially provide a flexible continuation of a main outer surface of that main fairing part towards and/or in contact with a main outer surface of the other main fairing part.

Options and advantages described above regarding the actuation assembly may apply correspondingly to the actuation mechanism, wherein in particular also the associated first actuator is provided. When the actuation mechanism comprises multiple such actuation assemblies and first actuators, the relevant advantages can be extended, for example across the flap and/or wing.

A further aspect provides a trailing edge flap assembly for an aircraft wing, comprising a trailing edge flap for an aircraft wing and at least one actuation assembly and/or actuation mechanism as described herein, the flap being hingeably connected to the respective intermediate unit at the first hinging axis and engageable by the second actuator for the controllable rotation about the first hinging axis.

Options and advantages described above regarding the actuation assembly and/or actuation mechanism may apply correspondingly to the trailing edge flap assembly, with the additional advantage that the at least one actuation assembly may thus be operatively connected to the flap.

Preferably, the trailing edge flap assembly comprises the associated first actuator, in particular respectively for each actuation assembly, for example as part of the respective actuation assembly or arranged adjacent thereto. In case the first actuator is arranged adjacent to the respective actuation assembly, the first actuator as part of the trailing edge flap assembly is preferably also connected to the flap, in particular separately from the intermediate unit of the actuation assembly.

A further aspect provides an actuation system for a trailing edge flap of an aircraft wing, comprising at least one actuation assembly and/or actuation mechanism as described herein and one or more control lines for operatively connecting the respective first and second actuators to a controller outside the respective actuation assembly.

Options and advantages described above regarding the actuation assembly may apply correspondingly to the actuation assembly, with the additional advantage of facilitating control of flap movements, e.g. through a central control system of the aircraft. The controller may be part of the actuation system as well.

A further aspect provides an aircraft wing provided with a trailing edge flap assembly as described herein, wherein the respective at least one base unit is fixed to a main body of the aircraft wing. In case the first actuator is arranged adjacent to the respective actuation assembly, the first actuator as part of the aircraft wing is preferably also connected to the main body of the aircraft wing, in particular separately from the at least one base unit of the actuation assembly.

A further aspect provides an aircraft having aircraft wings of which at least one, preferably each, is an aircraft wing as described herein.

Options and advantages described above regarding the actuation assembly and the trailing edge flap assembly may apply correspondingly to the aircraft wing and aircraft, with the additional advantage that the at least one actuation assembly and/or actuation mechanism may thus be operatively connected to the main body of the aircraft wing.

A further aspect provides a method of operating an aircraft, comprising: providing an aircraft as described herein; and operating the first and/or second actuator so as to adjust the trailing edge flap with respect to the main body of the aircraft wing. Optionally, the flap is operated to act both as a high-lift device and as an aileron, for example sequentially and/or simultaneously.

Options and advantages described above may apply correspondingly to the method of operating the aircraft.

DETAILED DESCRIPTION

In the following, the invention will be explained further using examples of embodiments and drawings. The drawings are schematic and merely show examples. In the drawings, corresponding elements are indicated with corresponding reference signs. For clarity of the drawings, where the same elements are shown throughout different figures, in some cases such elements are indicated with a reference sign only in one or some of such figures. In the drawings.

Figures 2, 3A, 3B:
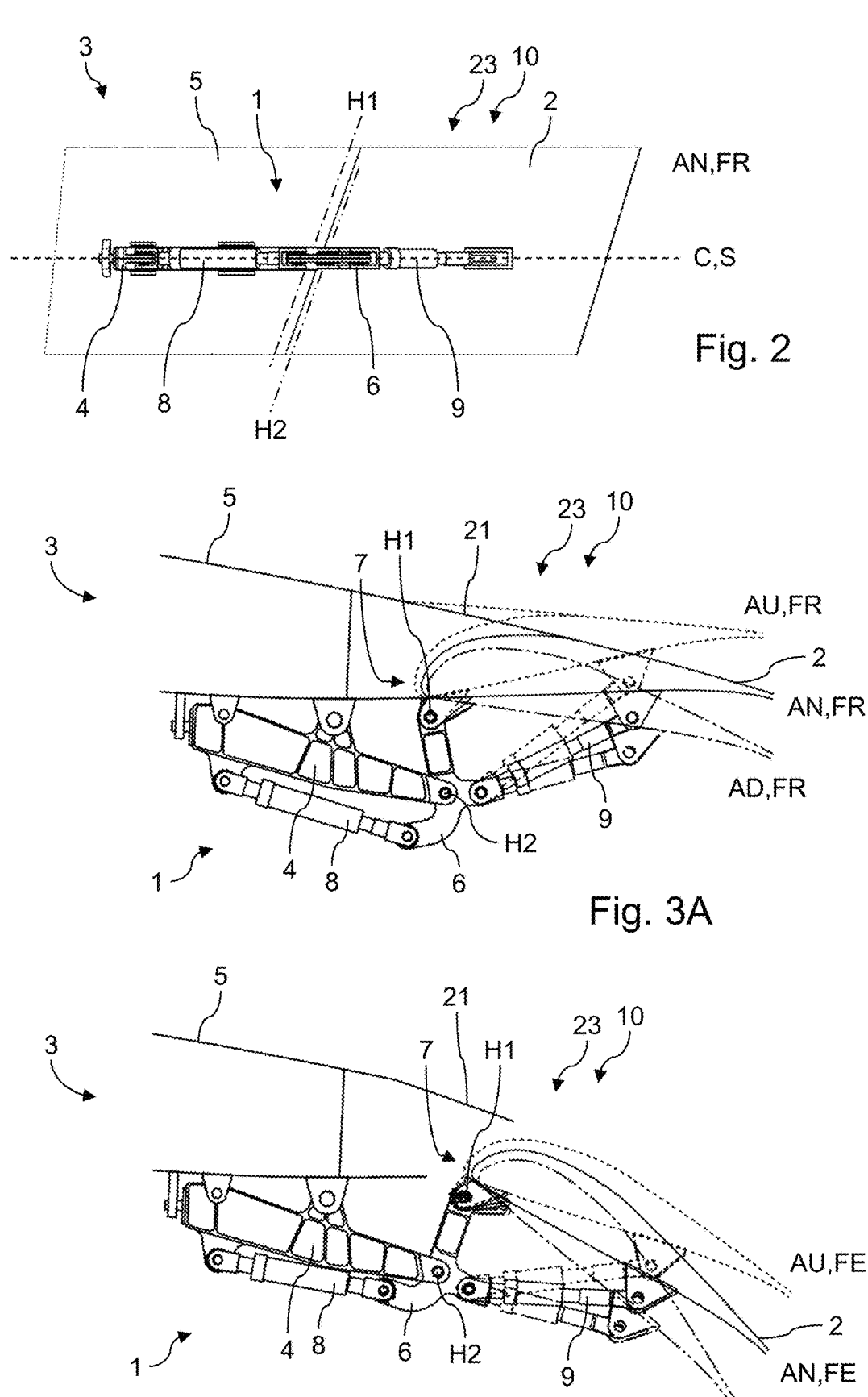
FIG. 2 shows a bottom view of an arrangement of a wing, a flap and an actuation assembly according to a first embodiment.
Figure 4A:
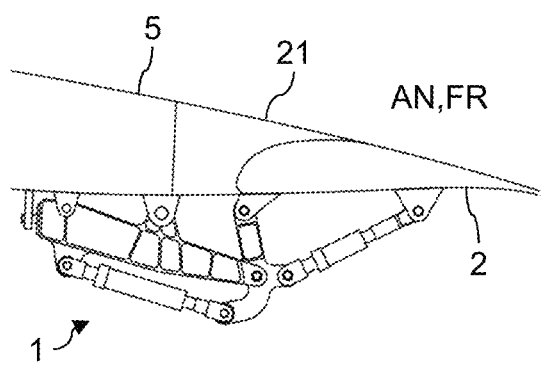
Figure 5A:
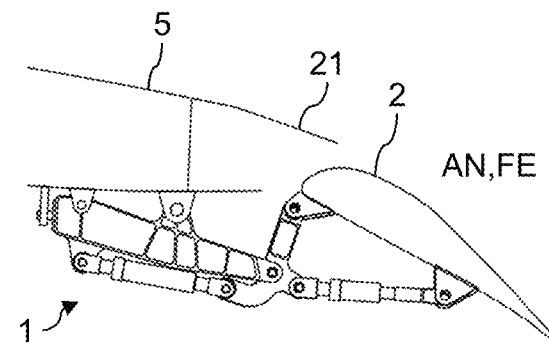
Figure 4B:
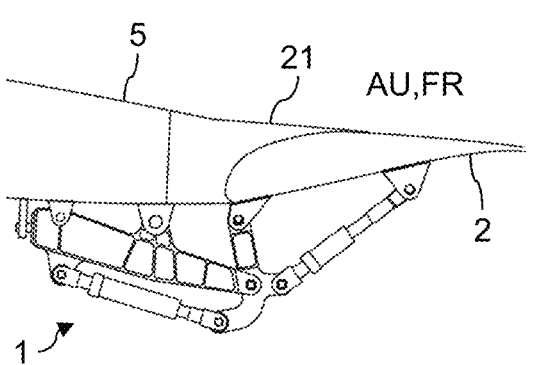
Figure 5B:
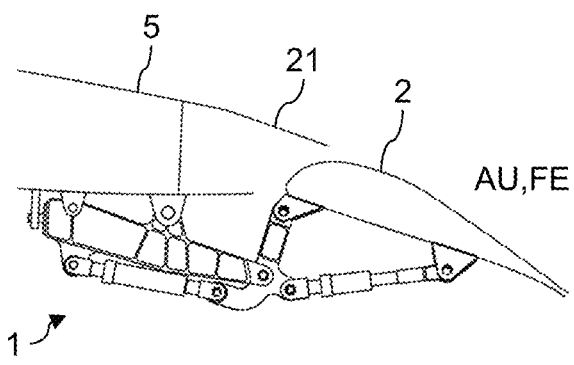
Figure 4C:
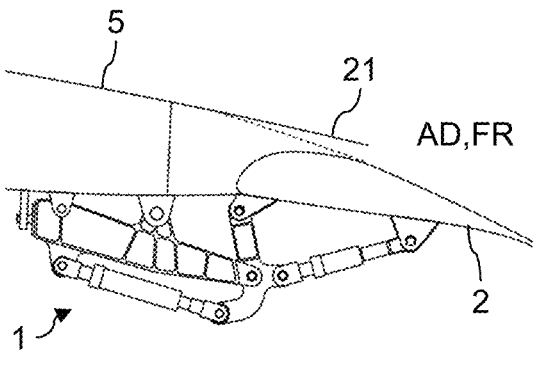
Figure 5C:
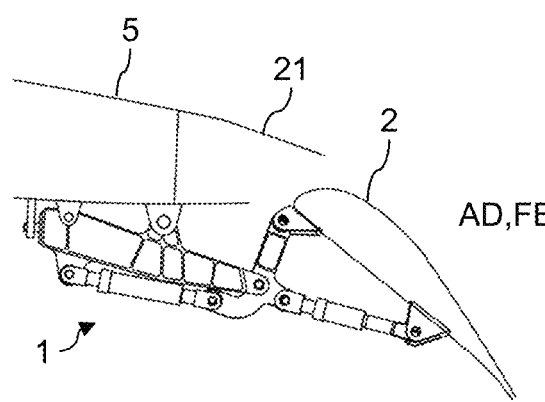
Figure 6A:
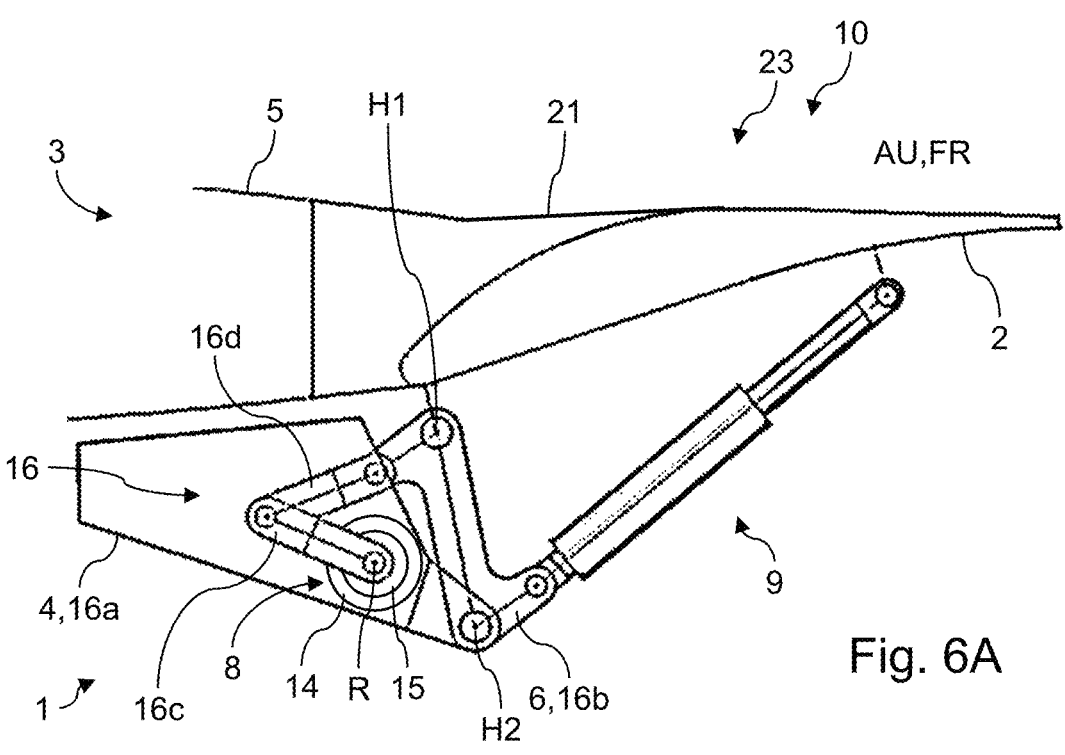
Figure 6B:
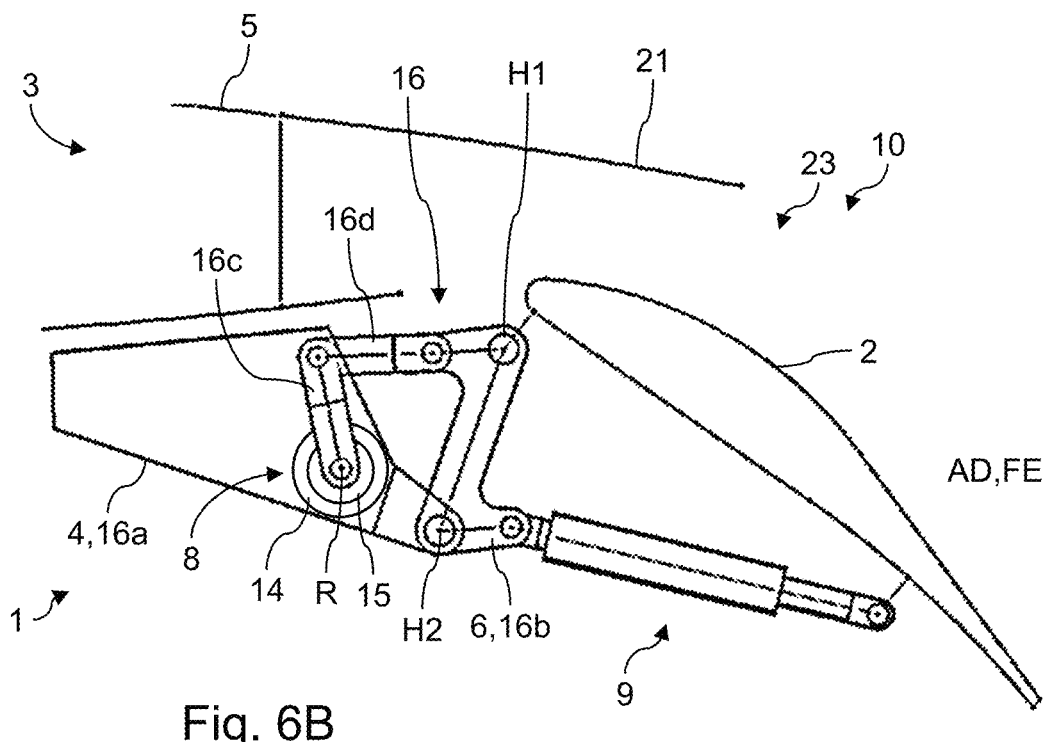
Figure 7:
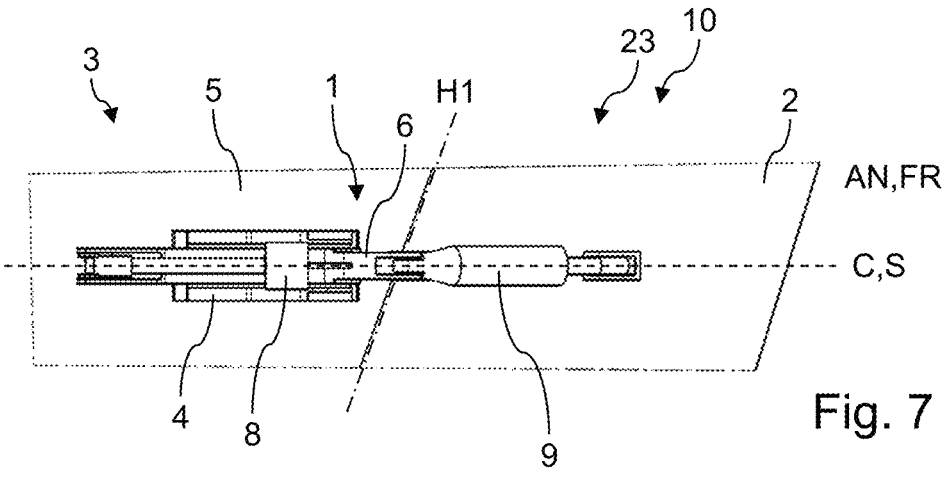
Figure 8A:
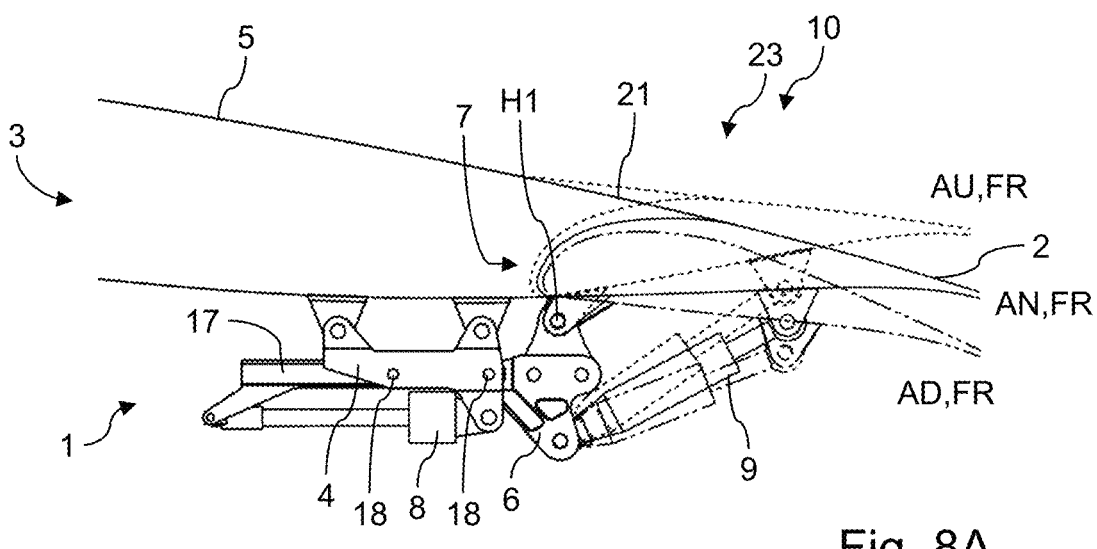
Figure 8B:
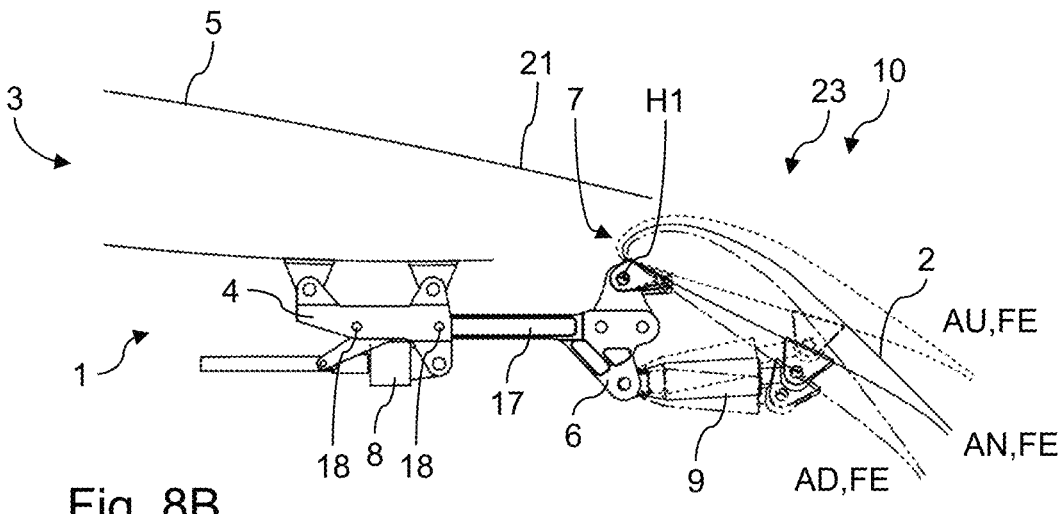
Figure 9A:
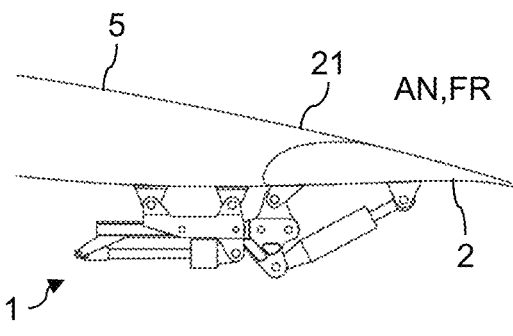
Figure 10A:
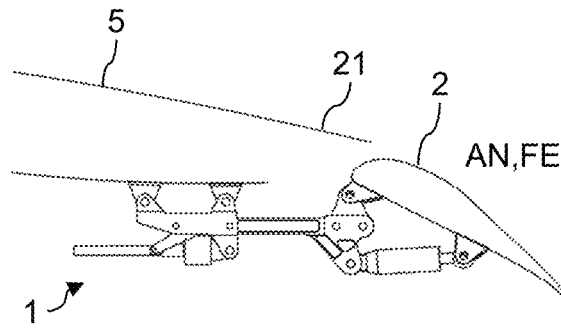
Figure 9B:
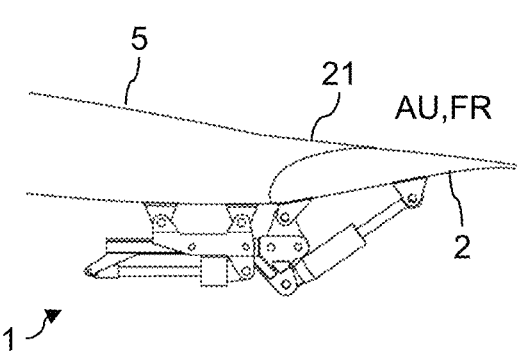
Figure 10B:
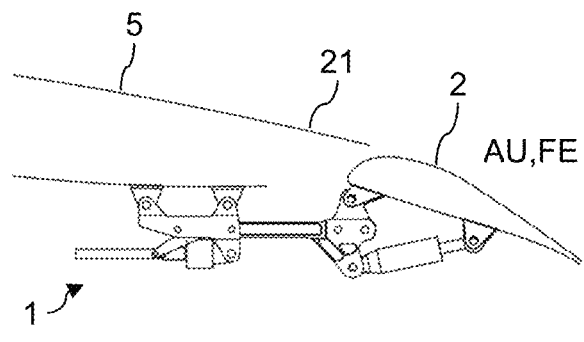
Figure 9C:
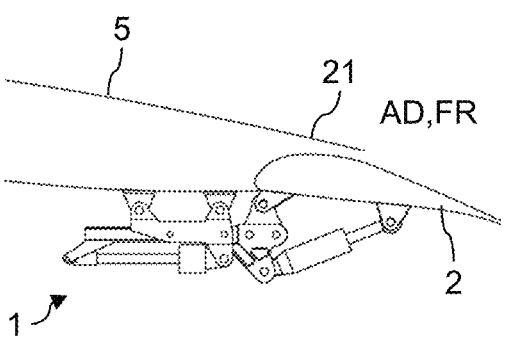
Figure 10C:
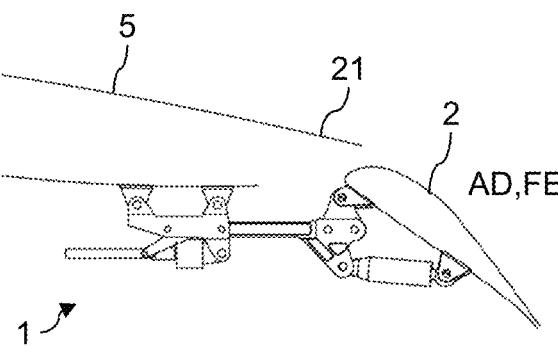
Figures 11, 12:
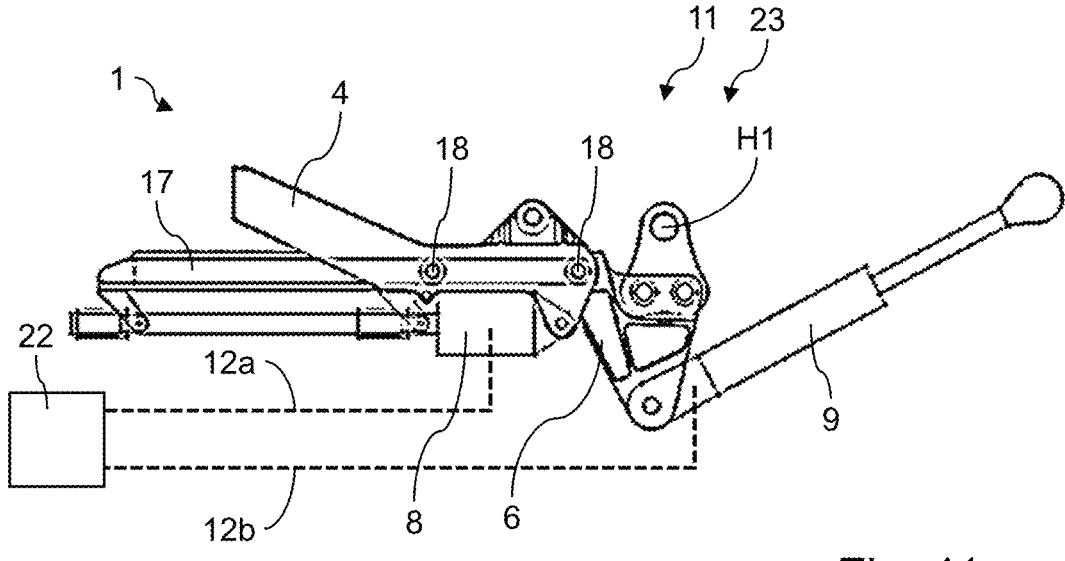
Figure 13:
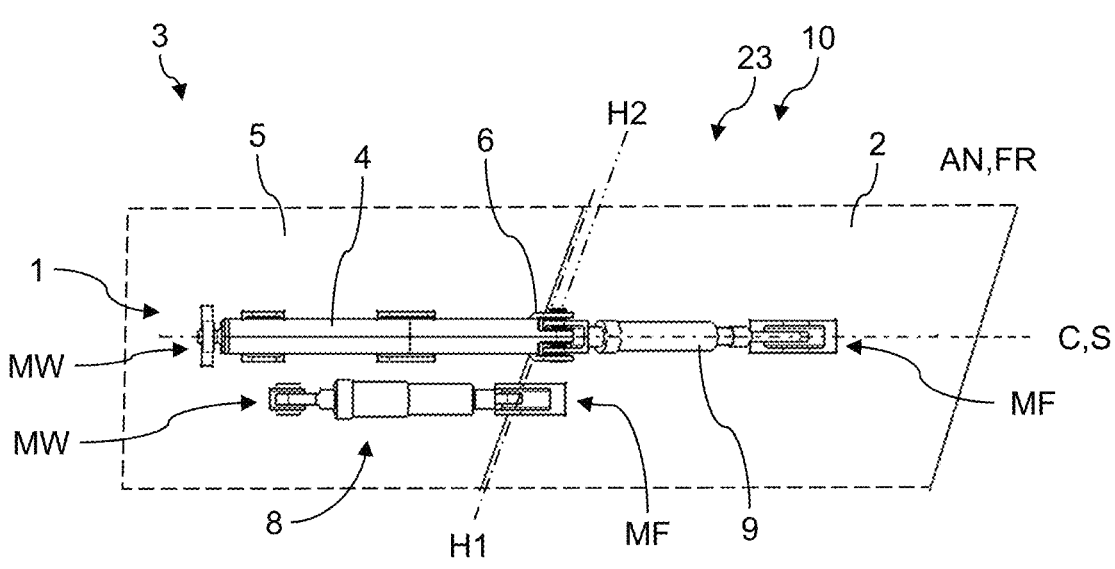
Figure 14:
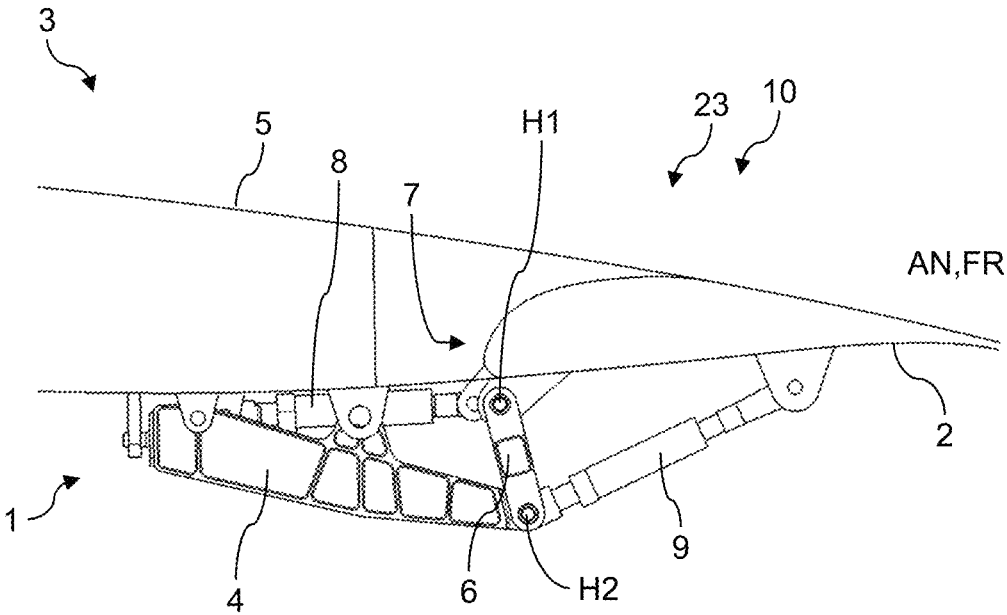
Figure 15:
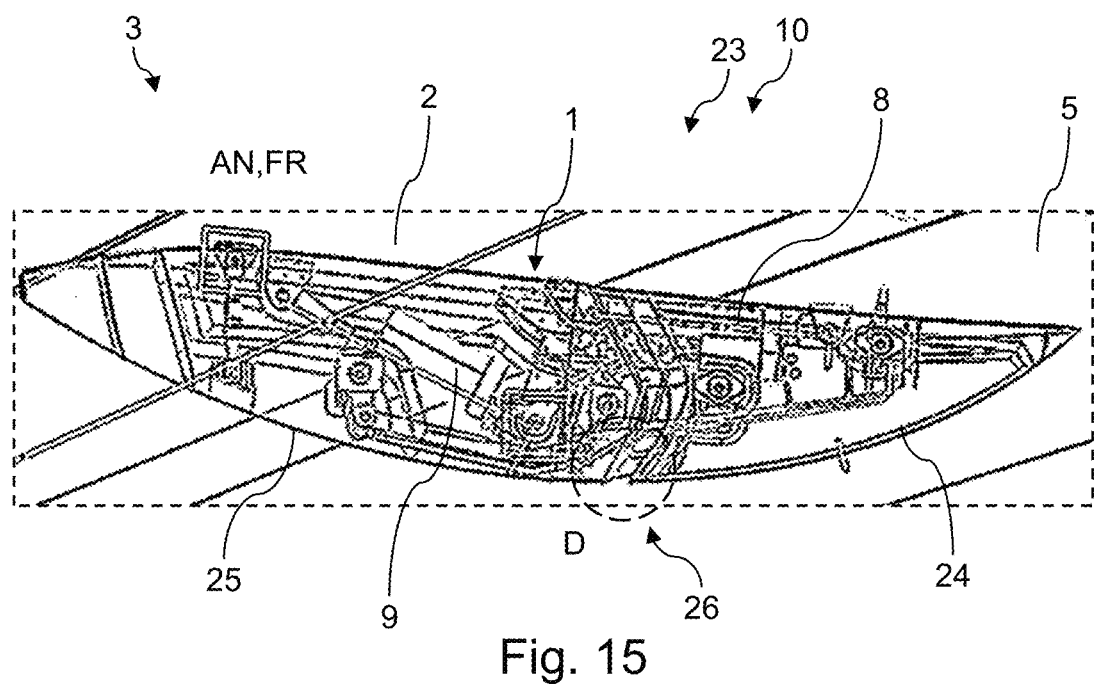
Figure 16A:
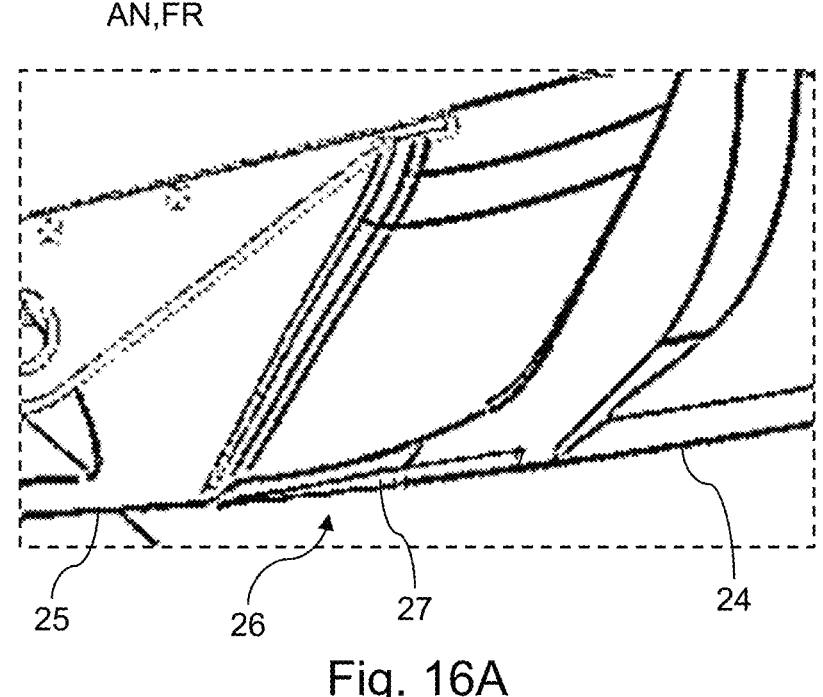
Figure 16B:
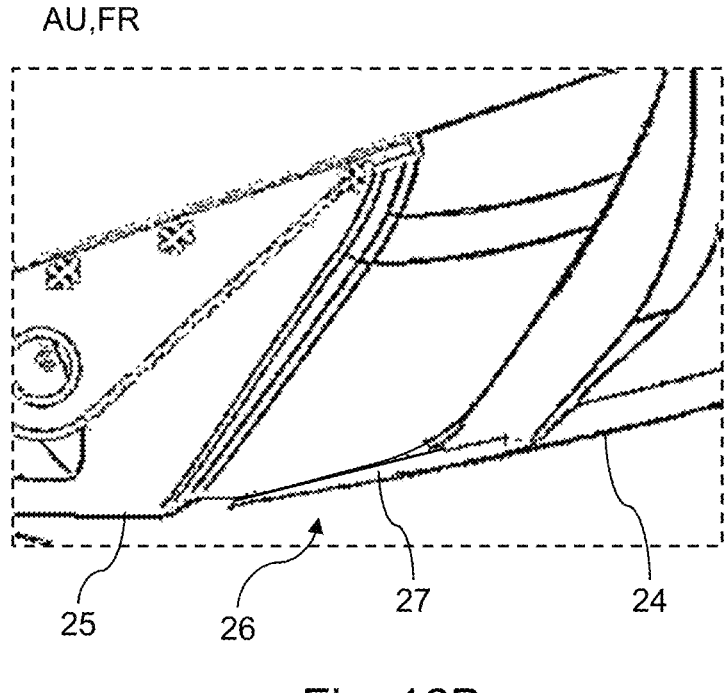
Figure 16C:
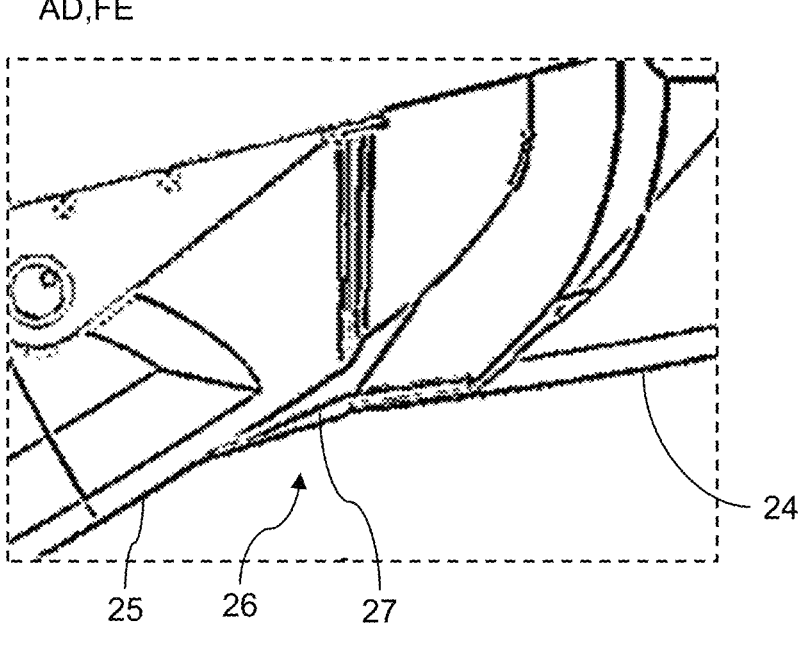

FIGS. 3A and 3B each show a side view of the arrangement of FIG. 2, wherein in FIG. 3A the flap is in a retracted flap position, wherein in FIG. 3B the flap is in an extended flap position, wherein in both figures three different aileron positions of the flap are shown using different line styles;

FIGS. 4A to 4C respectively show the three flap positions of FIG. 3A;

FIGS. 5A to 5C respectively show the three flap positions of FIG. 3B;

FIGS. 6A and 6B each show a side view of an arrangement of a wing, a flap and an actuation assembly according to a second embodiment, wherein in FIG. 6A the flap is in a retracted flap position and an aileron up position, wherein in FIG. 6B the flap is in an extended flap position and an aileron down position;

FIG. 7 shows a bottom view of an arrangement of a wing, a flap and an actuation assembly according to a third embodiment;

FIGS. 8A and 8B each show a side view of the arrangement of FIG. 7, wherein in FIG. 8A the flap is in a retracted flap position, wherein in FIG. 8B the flap is in an extended flap position, wherein in both figures three different aileron positions of the flap are shown using different line styles;

FIGS. 9A to 9C respectively show the three flap positions of FIG. 8A;

FIGS. 10A to 10C respectively show the three flap positions of FIG. 8B;

FIG. 11 shows a side view of an actuation assembly according to a fourth embodiment;

FIG. 12 shows a side view of an actuation assembly according to a fifth embodiment;

FIG. 13 shows a bottom view of an arrangement of a wing, a flap, an actuation assembly and a first actuator according to a sixth embodiment;

FIG. 14 shows a side view of the arrangement of FIG. 13;

FIG. 15 shows a partly transparent perspective view of a mounted actuation mechanism provided with a fairing; and FIGS. 16A to 16C each show a partly cross sectional view corresponding to detail D in FIG. 15, wherein in the subsequent figures the flap is in different positions relative to the main body of the wing.

FIGS. 1B to 14 show examples of embodiments of an actuation assembly 1 for a trailing edge flap 2 of an aircraft wing 3. The actuation assembly 1 comprises: at least one base unit 4 configured to be fixated to a main body 5 of the aircraft wing 3; and an intermediate unit 6 movably connected to the at least one base unit 4 and configured to be hingeably connected to the flap 2 at a leading edge 7 of the flap 2 about a first hinging axis H1 extending along the leading edge 7 of the flap 2. The movability of the intermediate unit 6 with respect to the at least one base unit 4, in particular in combination with an associated first actuator 8, provides controllable adjustability of the flap 2, when connected, between a retracted flap position FR and an extended flap position FE, wherein in the extended flap position FE the flap 2 extends further from the main body 5 of the aircraft wing 3 than in the retracted flap position FR. In the examples of FIGS. 1B to 12, the first actuator 8 is part of the actuation assembly 1.

In the example of FIGS. 13 and 14, the first actuator 8 is arranged adjacent to the actuation assembly 1, the first actuator 8 and actuation assembly being interconnected only via the main body 5 of the aircraft wing and via the flap 2.

The actuation assembly 1 comprises a second actuator 9 configured to controllably rotate the flap 2 with respect to the intermediate unit 6 about the first hinging axis H1, the second actuator 9 being configured to be movable along with the intermediate unit 6 with respect to the base unit 4 by the first actuator 8. In the examples of FIGS. 1B to 12, the second actuator 9 is connected to the intermediate unit 6. In the example of FIGS. 13 and 14, the second actuator 9 has a shared hinging axis H2 with both the intermediate unit 6 and the base unit 4.

In the shown examples, in particular when viewed in the direction of the first hinging axis H1, the second actuator 9 and the at least one base unit 4 extend away from each other from respective ends that are movably interconnected by and/or at the intermediate unit 6, both in the retracted flap position FR and the extended flap position FE.

In the examples of FIGS. 1B to 12, when viewed in the direction of the first hinging axis H1, the intermediate unit 6 is configured to mutually space apart the second actuator 9 and the at least one base unit 4, both in the retracted flap position FR and the extended flap position FE.

In the shown examples, the controllable rotation of the flap 2 by the second actuator 9 allows the flap 2 to be used as an aileron of the aircraft wing 3, providing adjustability of the flap 2 between an aileron up position AU and an aileron down position AD via an intermediate aileron neutral position AN, in particular in combinations with both the retracted flap position FR and the extended flap position FE.

In FIGS. 3A-B and 8A-B, the aileron up position AU is shown using dotted lines, the aileron down position AD is shown using dash-dot-dot lines, and the aileron neutral position AN is shown using solid lines. In FIGS. 4A-C and 5A-C, the six combinations of flap positions (retracted, extended) and aileron positions (up, down, neutral) of FIGS. 3A-B are shown separately. In FIGS. 9A-C and 10A-C, the six combinations of flap and aileron positions of FIGS. 8A-B are shown separately. It shall thus be appreciated that in these examples the flap 2 can be adjusted between the flap retracted position FR and the flap extended position FE independently from the adjustment of the flap between the aileron up position AU and aileron down position AD, and vice versa. In other words, the flap and aileron positions as described herein do not necessarily completely determine the flap's arrangement relative to the main body 5 of the wing 3. Moreover, it shall be appreciated that various intermediate positions are possible, for example intermediate positions between the retracted flap position FR and the extended flap position FE, and intermediate positions between the mentioned aileron positions AU, AN and AD.

FIGS. 1B to 10 and 13 to 14 also show examples of a trailing edge flap assembly 10 for an aircraft wing 3, comprising a trailing edge flap 2 for an aircraft wing 3 and at least one actuation assembly 1 as described herein, the flap 2 being hingeably connected to the respective intermediate unit 6 at the first hinging axis H1 and engageable by the second actuator 9 for the controllable rotation about the first hinging axis H1. Although FIGS. 11 and 12 do not show a wing or a flap, it shall be appreciated that the actuation assemblies 1 shown there may correspondingly be used in a trailing edge flap assembly 10. In the shown examples, the actuation assembly 1 is part or all of an actuation mechanism 23 that comprises the first actuator 8, either as part of the actuation assembly 1 or arrangeable adjacent thereto. The actuation mechanism 23 is here part of the trailing edge flap assembly 10.

FIGS. 11 and 12 show examples of an actuation system 11 for a trailing edge flap 2 of an aircraft wing 3, comprising at least one actuation assembly 1 as described herein and one or more control lines 12a, 12b for operatively connecting the respective first and second actuators 8, 9 to a controller 22 outside the respective actuation assembly 1. Although FIGS. 1B to 10C do not show such control lines and controller, it shall be appreciated that the actuation assemblies 1 shown there may correspondingly be provided with such control lines for connection with such a controller. In view of the mobility of the second actuator 9 relative to the main body 5 of the wing 3, where the control lines 12a, 12b may be substantially fixed to, a suitable amount of slack is prefer-
ably provided in the control line 12b for the second actuator
9, in particular to accommodate the adjustment of the
intermediate unit 6 by the first actuator 8.

Figures 1A, 1B:
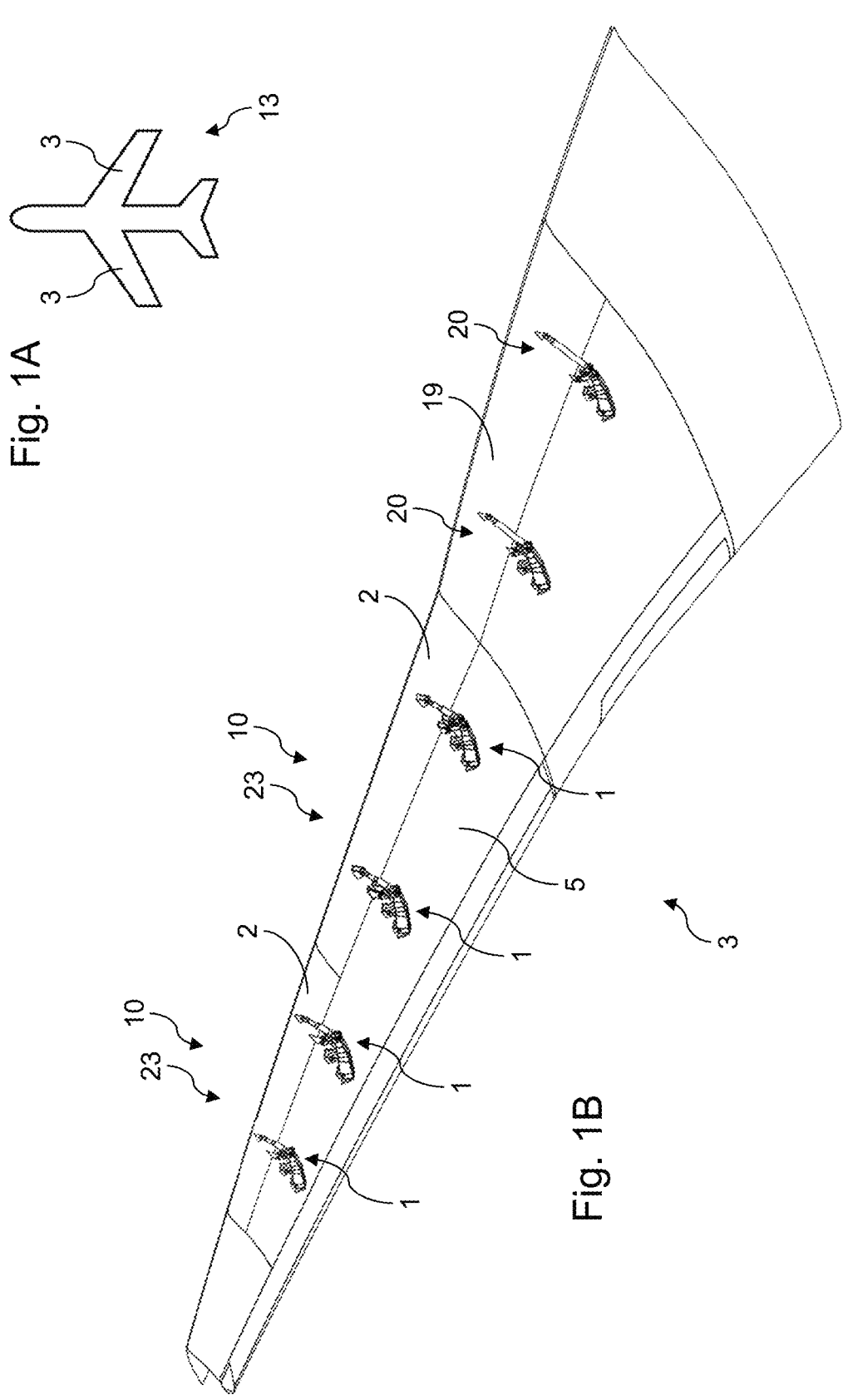
FIG. 1A shows a top view of an aircraft.
FIG. 1B shows a perspective view of an aircraft wing in a viewing direction substantially facing an underside of the wing.

FIG. 1B shows an example of an aircraft wing 3 provided
with a trailing edge flap assembly 10 as described herein,
wherein the respective at least one base unit 4 is fixed to a
main body 5 of the aircraft wing 3. It shall be appreciated
that any of the types of actuation assembly 1 and/or actua-
tion mechanism 23 shown in FIGS. 2 to 14 could be used in
place of any of the actuation assemblies 1 shown in FIG. 1B.
The flap 2 may be arranged on the aircraft wing 3 as a middle
flap and/or outboard flap, for example. As may be under-
stood from FIG. 1B, the aircraft wing 3 may comprise one
or more further flaps 19, for example an inboard flap, and/or
one or more further actuation assemblies 20 that may or may
not be according to the invention.

FIG. 1A shows an example of an aircraft 13 having
aircraft wings 3 as described herein, i.e. provided with a
trailing edge flap assembly 10 as described herein. Although
not shown in any detail in FIG. 1A, the wings 3 of the
aircraft 13 shown in FIG. 1A could for example be config-
ured as shown in FIG. 1B.

In view of the above, the figures also illustrate a method
of operating an aircraft 13, comprising: providing an aircraft
13 as described herein; and operating the first and/or second
actuator 8,9 so as to adjust the trailing edge flap 2 with
respect to the main body 5 of the aircraft wing 3. Preferably,
the flap 2 is operated to act both as a high-lift device and as
an aileron, for example sequentially and/or simultaneously.

In the shown examples, the actuation assembly 1 has a
symmetrical mechanical arrangement with a plane of sym-
metry S extending at an angle to the first hinging axis H1.

In the shown examples, the second actuator 9 is a linear
actuator. Here, at least when the flap 2 is in the retracted flap
position FR and the aileron neutral position AN, the second
actuator 9 as linear actuator has an actuation line that
substantially coincides with a central plane C of the at least
one base unit 4, said central plane extending at an angle to
the first hinging axis H1, in particular at a central position
with respect to the fixation of the at least one base unit 4 to
the main body 5 of the aircraft wing 3. In the figures, the
actuation line of the second actuator 9, i.e. the line along
which the second actuator 9 causes linear motion, can be
understood from the linear arrangement of the second actua-
tor 9 itself. It shall be appreciated that the arrangement of the
actuation line of the second actuator 9 relative to the central
plane C may be somewhat variable depending on the posi-
tion of the flap 2 relative to the main body 5 of the wing 3.
Thus, in some flap positions, the actuation line may include
a small angle with the central plane C. Hingeable connec-
tions at the ends of the second actuator 9 may be configured
to allow such variability.

In the shown examples except the example of FIGS.
6A-B, the first actuator 8 is a linear actuator.

In the examples of FIGS. 2 to 6B and 13 to 14, the
movable connection of the intermediate unit 6 to the at least
one base unit 4 is a hingeable connection defining a second
hinging axis H2 extending substantially parallel to the first
hinging axis H1 at a distance from the first hinging axis H1,
wherein the movement of the intermediate unit 6 with
respect to the at least one base unit 4 by the first actuator 8
is a rotation about the second hinging axis H2.

In the example of FIGS. 13-14, during use and/or as part
of the actuation mechanism 23, the actuation assembly 1 and
the first actuator 8 are structurally interconnected via the
main body 5 of the aircraft wing 3 and via the flap 2. The actuation mechanism 23 is here free from structural inter-
connections between the actuation assembly 1 and the first
actuator 8 that do not comprise any section of the flap 2 or
the main body 5 of the aircraft wing 3.

In the example of FIGS. 13-14, during use and/or as part
of the actuation mechanism 23, the actuation assembly 1 and
the first actuator 8 are mounted to the main body 5 of the
aircraft wing 3 at mutually different wing mount positions
MW along the first hinging axis H1. Here, during use and/or
as part of the actuation mechanism 23, the actuation assem-
bly 1 and the first actuator 8 are mounted to the flap 2 at
mutually different flap mount positions MF along the first
hinging axis H1. The different wing mount positions MW
and/or flap mount positions MF here determine an interspace
between the first actuator 8 and the actuation assembly 1, in
particular along the first hinging axis H1. Although not
shown as such in FIGS. 13-14, respective mounts of the first
actuator 8 and the actuation assembly 1 may be in non-
structural mutual contact when mounted.

In the example of FIGS. 13-14, during use of the actuation
assembly 1 and/or as part of the actuation mechanism 23,
both the first actuator 8 and the intermediate unit 6 are
hingeably connected to the flap 2 at the leading edge 7 of the
flap 2 about the first hinging axis H1. Thus, the first actuator
8 and the actuation assembly 1 are here mounted to the flap
2 such that the flap 2 can hinge with respect to both the first
actuator 8 and the intermediate unit 6 about the same first
hinging axis H1 that extends along the leading edge 7 of the
flap 2. To facilitate such hinging, individual hinges of the
actuation assembly 1 and/or the first actuator 8 may be
configured to provide rotational freedom in terms of a
hinging axis orientation with respect to the hinge.

In the example of FIG. 6A-B, the first actuator 8 is a rotary
actuator having a stator 14 and a rotor 15, the rotor 15 being
rotatably actuatable with respect to the stator 14 about a first
actuator rotation axis R. Here, the stator 14 is coupled to the
at least one base unit 4, wherein the rotor 15 is coupled to
the intermediate unit 6. Here, the first actuator rotation axis
R extends substantially parallel to the second hinging axis
H2 at a distance from the second hinging axis H2.

In the example of FIG. 6A-B, the coupling between the
rotor 15 and the intermediate unit 6 is provided by a linkage
16. Here, the linkage is, or is part of, a double rocker linkage
having a ground link 16a, two rocker links 16b, 16c and a
floating link 16d, wherein the at least one base unit 4 is
configured to form the ground link 16a, wherein the inter-
mediate unit 6 is configured to form one of the rocker links
16b, wherein the rotor 15 of the first actuator 8 is coupled to
the other one of the rocker links 16c.

In the examples of FIGS. 7 to 12, the movable connection
of the intermediate unit 6 to the at least one base unit 4 is a
slidable connection defining a slide path extending substan-
tially transverse to the first hinging axis H1, wherein the
movement of the intermediate unit 6 with respect to the at
least one base unit 4 by the first actuator 8 is a movement
along the slide path. Here, the intermediate unit 6 comprises
a track 17 slidably engaged with the at least one base unit 4
to form the slidable connection. When comparing FIG. 8B
to FIG. 8A, for example, it can be seen that the track 17 has
been moved to the right with respect to the base unit 4, in
particular along a substantially straight slide path extending
substantially parallel with the main direction of the track 17.
Thus, the slide path may be defined by the possible mutual
positions of the track 17 and the at least one base unit 4 when
mutually engaged.

Here, the at least one base unit 4 is provided with rollers
18 for the slidable engagement with the track 17 of the intermediate unit 6. In the figures, only shaft ends of such rollers 18 can be seen and are indicated with reference sign 18, wherein it shall be appreciated that the rollers themselves are obscured by a side wall of the at least one base unit 4. Alternatively or additionally to such rollers 18, sliding pads may be used, e.g. attached to the at least one base unit 4.

Here, the track 17 is straight so as to define a straight slide path, in particular so that the movement of the intermediate unit 6 with respect to the at least one base unit 4 by the first actuator 8 is a pure translation.

In the example of FIG. 12, the number of base units 4 of the at least one base unit 4 is two. Here, each of the base units 4 is provided with one or more respective rollers 18 that here engage with the same track 17.

As can be seen in several of the figures, a spoiler 21 may be provided at an upper end of the trailing edge of the wing 3, as is as such customary in combination with trailing edge flaps.

With reference to FIGS. 15 and 16A-C as illustration, the actuation assembly 1 and the actuation mechanism 23 may be provided with a fairing. The fairing is here configured to also cover the associated first actuator during use, and comprises two main fairing parts 24 and 25, wherein a first main fairing part 24 is coupled to the at least one base unit 4 and a second main fairing part 25 is coupled to the flap 2, e.g. via a drive strut. Here, the second main fairing part 25 is also hingeably coupled to the base unit 4. Alternatively, in particular for variants having a sliding intermediate unit 6 such as in the examples of FIGS. 7 to 12, such a second fairing part may be coupled to the intermediate unit 6 in addition to being coupled to the flap 2. The fairing here comprises a flexible and/or resilient bridging element 27 that is arranged to cover and/or seal a gap or other aerodynamic interruption 26 between said main fairing parts 24, 25 while still allowing mutual movement of said main fairing parts 24, 25 for the different possible flap positions including aileron positions. For example, FIG. 16A shows how the bridging element 27 bridges the interruption 26 in the aileron neutral AN and retracted flap FR position. FIG. 16B shows how the bridging element 27 bridges the interruption 26 in the aileron up AU and retracted flap FR position. FIG. 16C shows how the bridging element 27 bridges the interruption 26 in the aileron down AD and extended flap FE position. The bridging element 27 may be made from and/or comprise silicone, and is here arranged and shaped to reduce aerodynamic resistance of the fairing in different possible flap positions. The bridging element 27 here comprises a lip that is fixed to the first main fairing part 24 so as to substantially provide a flexible continuation of a main outer surface of that first main fairing part 24 towards and/or in contact with a main outer surface of the second main fairing part 25.

In view of the above, the present disclosure provides various examples of an actuation assembly and actuation mechanism for a trailing edge flap that can provide both high-lift and aileron functions for an aircraft wing. As shall be understood in view of the explanations provided herein, the configuration of the examples advantageously allows the respective actuation assembly and mechanism to be relatively light-weight and compact, for example having a relatively small width and/or height when seen in the flight direction of the aircraft, thereby enabling reduced drag. In particular, the actuation assembly may be relatively symmetrical, allowing a relatively well balanced arrangement with relatively little warping, in turn allowing a relatively slim and light-weight actuation assembly and mechanism. Meanwhile, various types of actuators can be applied, providing a high degree of design freedom. For aircraft, advantages provided by the invention include improved fuel efficiency and reduced emissions while maintaining or improving load efficiency and robustness.

Although the invention has been explained herein with reference to examples of embodiments and drawings, it shall be appreciated that these do not limit the scope of the invention as determined by the claims. Within said scope, many variations, combinations and extensions are possible, as shall be understood by the skilled person having the benefit of the present disclosure. For example, although in the shown examples the at least one base unit and first actuator are arranged outside a main body of the wing, these could also be arranged at least partly inside such a main body. All such variants are included within the scope of the invention as determined by the claims.

LIST OF REFERENCE SIGNS

1. Actuation assembly
2. Trailing edge flap
3. Aircraft wing
4. Base unit
5. Main body of aircraft wing
6. Intermediate unit
7. Leading edge of flap
8. First actuator
9. Second actuator
10. Trailing edge flap assembly
11. Actuation system
12*a*. Control line for first actuator
12*b*. Control line for second actuator
13. Aircraft
14. Stator
15. Rotor
16. Linkage
16*a*. Ground link
16*b*.16*c*. Rocker links
16*d*. Floating link
17. Track
18. Roller
19. Further trailing edge flap
20. Further actuation assembly
21. Spoiler
22. Controller
23. Actuation mechanism
24. First main fairing part
25. Second main fairing part
26. Aerodynamic interruption
27. Bridging element
AD. Aileron down position
AN. Aileron neutral position
AU. Aileron up position
C. Central plane of base unit
FE. Extended flap position
FR. Retracted flap position
H1. First hinging axis
H2. Second hinging axis
MF. Flap mount position
MW. Wing mount position
R. First actuator rotation axis
S. Plane of symmetry

The invention claimed is:

1. An actuation assembly for a trailing edge flap of an aircraft wing, comprising:

at least one base unit configured to be fixated to a main body of the aircraft wing;

an intermediate unit movably connected to the at least one base unit and configured to be hingeably connected to the flap at a leading edge of the flap about a first hinging axis extending along the leading edge of the flap, wherein the movability of the intermediate unit with respect to the at least one base unit, in combination with an associated first actuator that is also hingeably connected to the flap at the leading edge of the flap about the first hinging axis, provides controllable adjustability of the flap, when connected, between a retracted flap position and an extended flap position, wherein in the extended flap position the flap extends further from the main body of the aircraft wing than in the retracted flap position; and a second actuator configured to controllably rotate the flap with respect to the intermediate unit about the first hinging axis, the second actuator being configured to be movable along with the intermediate unit with respect to the at least one base unit.

2. The actuation assembly according to claim 1, wherein the actuation assembly has a symmetrical mechanical arrangement with a plane of symmetry extending at an angle to the first hinging axis.

3. The actuation assembly according to claim 1, wherein the second actuator is a linear actuator.

4. The actuation assembly according to claim 3, wherein, in one or more positions of the flap with respect to the main body of the aircraft wing, the second actuator as linear actuator has an actuation line that coincides with a central plane of the at least one base unit, said central plane extending at an angle to the first hinging axis.

5. The actuation assembly according to claim 1, wherein the first actuator is a linear actuator.

6. The actuation assembly according to claim 1, wherein the movable connection of the intermediate unit to the at least one base unit is a hingeable connection defining a second hinging axis extending parallel to the first hinging axis at a distance from the first hinging axis, wherein movement of the intermediate unit with respect to the at least one base unit by the first actuator is a rotation about the second hinging axis.

7. The actuation assembly according to claim 1, wherein the controllable rotation of the flap by the second actuator allows the flap to be used as an aileron of the aircraft wing, providing adjustability of the flap between an aileron up position and an aileron down position via an intermediate aileron neutral position.

8. The actuation assembly according to claim 1, wherein the first actuator or the second actuator is or comprises at least one of an electric actuator, a hydraulic or electrohydraulic actuator, an electrohydrostatic actuator and a driveshaft driven actuator.

9. The actuation assembly according to claim 1, wherein the second actuator and the at least one base unit extend away from each other from respective ends that are movably interconnected, both in the retracted flap position and the extended flap position.

10. The actuation assembly according to claim 1, wherein the actuation assembly and the first actuator are configured to be arranged adjacent to each other to be interconnected via the main body of the aircraft wing and via the flap.

11. An actuation mechanism for a trailing edge flap of an aircraft wing, comprising at least one actuation assembly according to claim 1, wherein the actuation mechanism comprises the associated first actuator that is also hingeably connected to the flap at the leading edge of the flap about the first hinging axis.

12. The actuation mechanism according to claim 11, wherein the at least one actuation assembly and the first actuator are arranged adjacent to each other to be interconnected via the main body of the aircraft wing and via the flap.

13. A trailing edge flap assembly for an aircraft wing, comprising a trailing edge flap for an aircraft wing and at least one actuation assembly according to claim 1, the flap being hingeably connected to the respective intermediate unit at the first hinging axis and engageable by the second actuator for the controllable rotation about the first hinging axis.

14. An aircraft wing provided with a trailing edge flap assembly according to claim 13, wherein the respective at least one base unit is fixed to a main body of the aircraft wing.

15. An aircraft having aircraft wings of which at least one is the aircraft wing according to claim 14.

16. A method of operating an aircraft, comprising:

providing an aircraft according to claim 15; and operating at least one of the first actuator and the second actuator so as to adjust the trailing edge flap with respect to the main body of the aircraft wing.

17. A method according to claim 16, wherein the flap is operated to act both as a high-lift device and as an aileron, sequentially and/or simultaneously.

18. The trailing edge flap assembly according to claim 13, wherein the at least one actuation assembly and the first actuator are arranged adjacent to each other to be interconnected via the main body of the aircraft wing and via the flap.

19. An actuation system for a trailing edge flap of an aircraft wing, comprising at least one actuation assembly according to claim 1, and further comprising one or more control lines for operatively connecting the respective first and second actuators to a controller outside the respective actuation assembly.

20. An actuation assembly for a trailing edge flap of an aircraft wing, comprising:

at least one base unit configured to be fixated to a main body of the aircraft wing;

an intermediate unit movably connected to the at least one base unit and configured to be hingeably connected to the flap at a leading edge of the flap about a first hinging axis extending along the leading edge of the flap, wherein the movability of the intermediate unit with respect to the at least one base unit provides controllable adjustability of the flap, when connected, between a retracted flap position and an extended flap position, wherein in the extended flap position the flap extends further from the main body of the aircraft wing than in the retracted flap position; and a second actuator configured to controllably rotate the flap with respect to the intermediate unit about the first hinging axis, the second actuator being configured to be movable along with the intermediate unit with respect to the at least one base unit.

* * * * *